Oct. 23, 1956 G. T. KODAMA 2,767,648

AUTOMATIC SCREENING MACHINE

Filed Oct. 10, 1951 5 Sheets-Sheet 1

GEORGE T. KODAMA
INVENTOR.

BY Arthur G. Connolly
HIS ATTORNEY

Oct. 23, 1956 G. T. KODAMA 2,767,648

AUTOMATIC SCREENING MACHINE

Filed Oct. 10, 1951 5 Sheets-Sheet 2

GEORGE T. KODAMA
INVENTOR.

BY Arthur G. Connolly
HIS ATTORNEY

GEORGE T. KODAMA
INVENTOR.
BY Arthur G. Connolly
HIS ATTORNEY

Oct. 23, 1956

G. T. KODAMA 2,767,648

AUTOMATIC SCREENING MACHINE

Filed Oct. 10, 1951

5 Sheets-Sheet 4

GEORGE T. KODAMA
INVENTOR.

BY Arthur G. Connolly
HIS ATTORNEY

Oct. 23, 1956 G. T. KODAMA 2,767,648

AUTOMATIC SCREENING MACHINE

Filed Oct. 10, 1951 5 Sheets-Sheet 5

GEORGE T. KODAMA
INVENTOR.

BY Arthur G. Connolly
HIS ATTORNEY

United States Patent Office 2,767,648

Patented Oct. 23, 1956

2,767,648

AUTOMATIC SCREENING MACHINE

George T. Kodama, Nashua, N. H., assignor to Sprague Electric Company, North Adams, Mass., a corporation of Massachusetts Application October 10, 1951, Serial No. 250,734

6 Claims. (Cl. 101—126)

This invention relates to new and improved machines for screening small electrical components, and more specifically to machines for placing either conductance or resistance layers upon small dielectric plates at a rapid rate of speed.

In the past printed circuit elements have been placed upon small dielectric plates (such as ceramic) by a hand-screening process which is both laborious, and difficult to control. The final resistance values obtained in screening resistance inks upon such plates have varied tremendously with the skill, speed, etc., of a particular operator. In addition, the limitations placed upon these small printed circuit elements by virtue of their expensive hand-manufacturing operations have made them unavailable for many applications. Modern electronics equipment has made it necessary that printed circuit elements be more rapidly produced than can be done by prior methods.

It is an object of this invention to overcome the foregoing and related disadvantages of the prior art. A further object is to produce a machine which can stencil printed circuit elements upon dielectric plates at an extremely rapid rate as compared with the present rates for hand production. A still further object of the invention is to produce a machine for the purposes described which will print resistance and other conductive layers accurately with known or predictable values. These and further objects will become apparent from this description and the appended claims.

The foregoing objects are attained by the use of a conical-shaped printing screen which rotates past and with a rotating table which holds a series of small ceramic dielectric plates. Perhaps the invention may best be understood with reference to the appended drawings in which.

Figure 1:
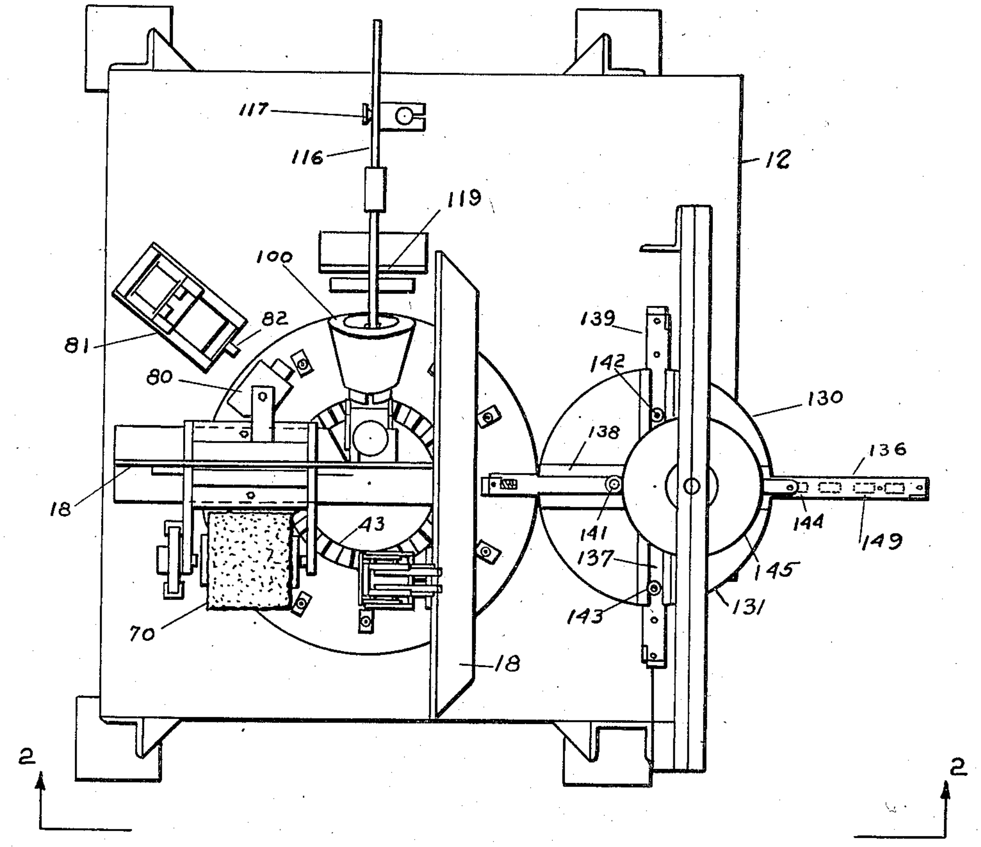
Figure 1 shows a top view of the automatic screening machine.
Figure 2:
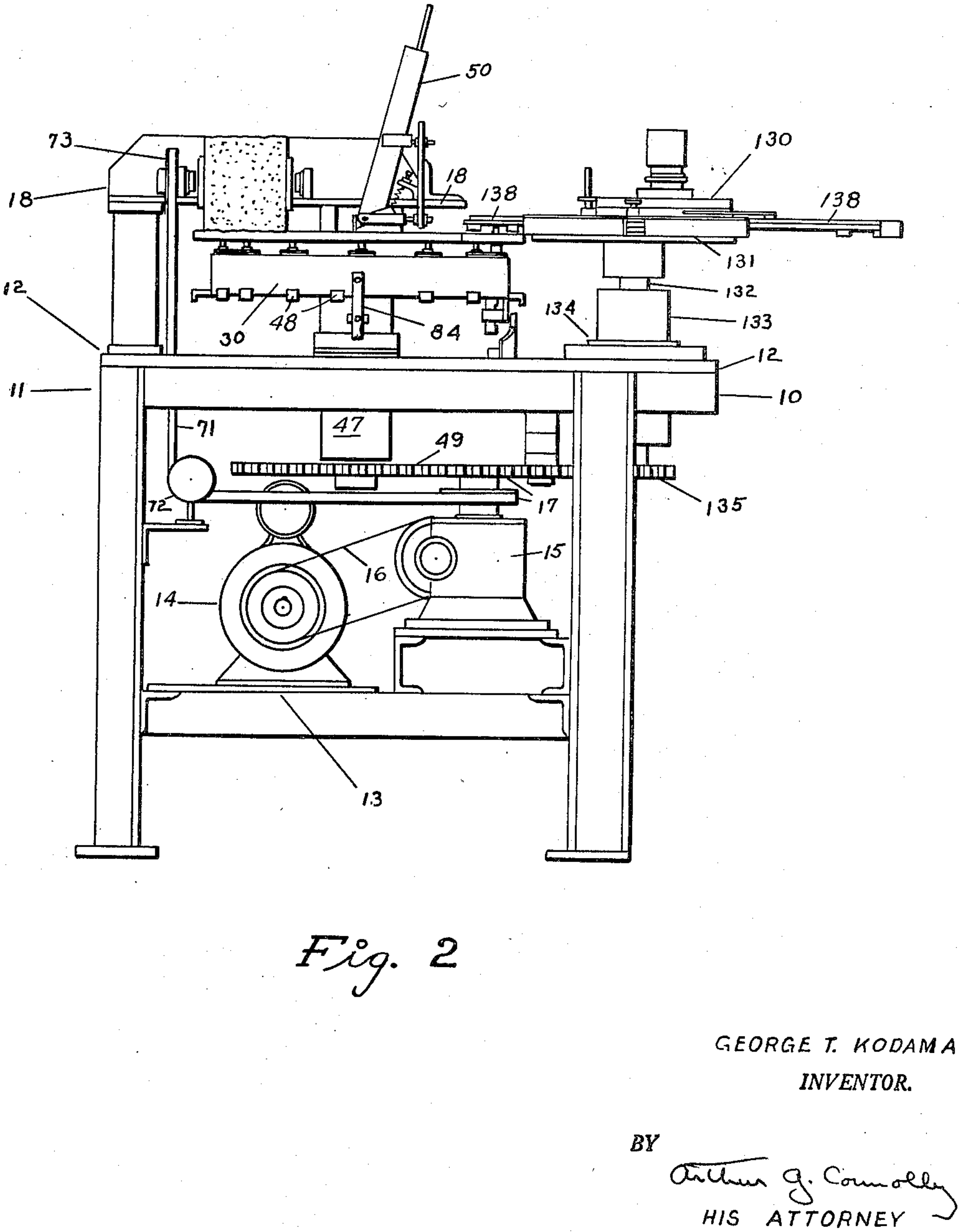
Figure 2 shows a similar view taken at one side of this machine along line 2—2 in Figure 1.

Referring more specifically to Figures 1 and 2, it is seen that the machine 10 is formed on an appropriate base 11 having a top 12. On a shelf 13 below this top a motor 14, used to drive the entire assembly, is placed so as to be connected to a speed reducer 15 by a belt assembly 16. The reducer in turn is connected by a series of pulleys and gears generally shown at 17 to the other moving parts of the machine, as will be apparent. A principal moving part is the rotating table 30 positioned upon a bearing mount 47 (note Figure 4) supported by the top 12 of the base. This circular table 30 constantly rotates past the feeder assembly 50, the rotating brush 70, feeler switch 80, the screening cone 100, and the stacker assembly 130.

Figures 3, 4:
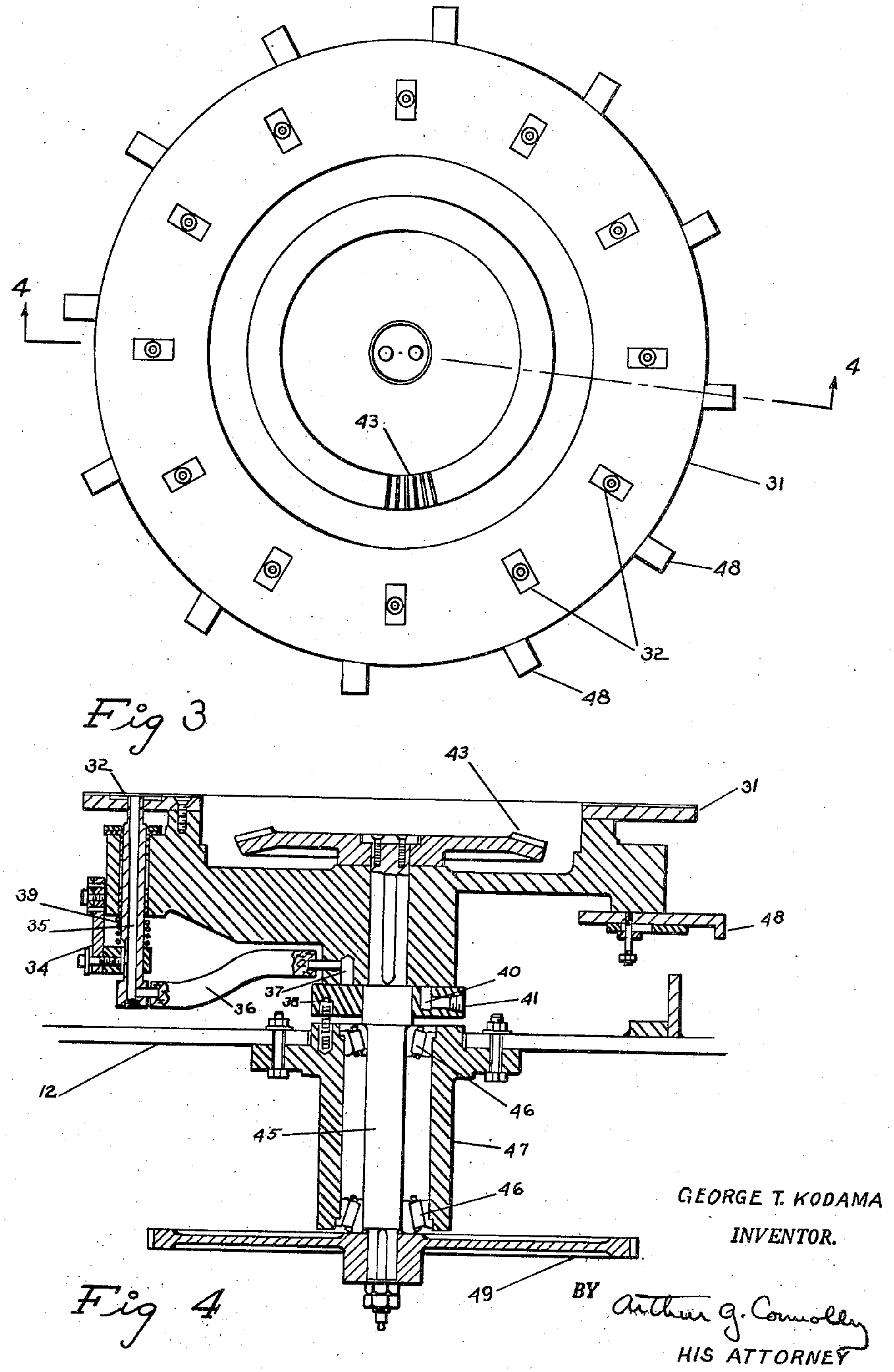
Figure 3 illustrates a top plan view of the rotating table which is used to support ceramic bases.
Figure 4 shows a sectional view of this table taken at line 4—4 in Figure 3.

As is seen in Figures 3 and 4, the constantly moving table 30 is composed of a flat annular top 31 containing a number of small depressed openings 32 designed to hold individual bases during the printing operation. Each of these depressions 32 is connected by an appropriate passage 35 through the table top to a tube 36 which in turn connects to an annular passage 37 within the circular hub of the table 30. This annular passage terminates at the surface of a stationary bearing-like block 38, having a further opening 40 which is adapted to register intermittently with the passage 37. During the operation of the machine an appropriate suction line is attached at 41 to the block 38 to draw a suction in passageway 37, line 36 and passage 35, so as to hold the small dielectric base plates in position within the depressed openings, or more properly, recessed cavities 32 as the table rotates. A centrally depressed portion of this table contains gear 43 which is used to drive the assembly 100. The entire table 30 is driven by the shaft 45 projecting through bearings 46 carried by a stationary sleeve shaft 47. This shaft in turn is driven by the gear 49 secured at its bottom lower end which in turn makes connection with the speed reducer as is best seen with reference to Figure 2.

Depending from the bottom of the table 30 are a series of slidable stop elements 48 which may be extended during the operation of the machine as will be more fully explained later. The holding mechanism 34, including the spring 39, is designed to maintain the air shaft 35 in proper operating position.

Figure 8:
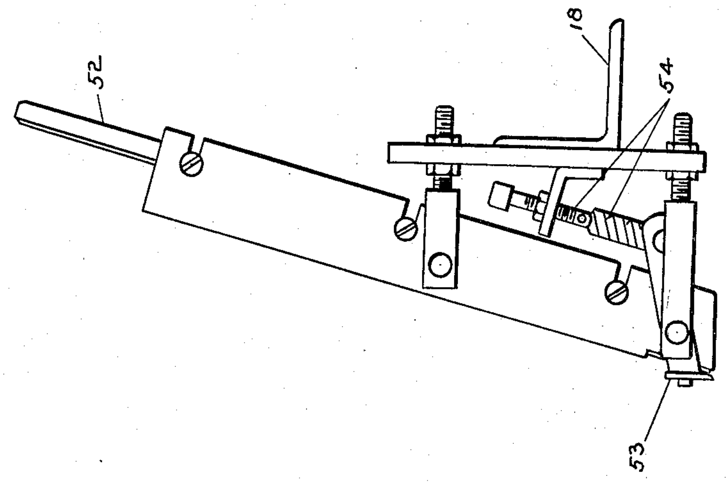
Figures 7 and 8 show front and side views of the feeder assembly, respectively.
Figure 7:
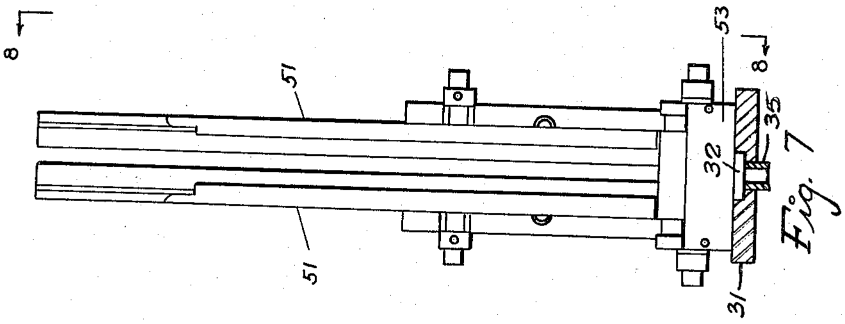

The feeder assembly used to position the small dielectric plates upon the table top is most advantageously seen with reference to Figures 7 and 8. This assembly 50 comprises two side walls 51 and an adjustable back wall 52 forming a chute for the stacked plates. The chute assembly has no bottom wall and its wide open lower end holds the bottom of the stack against the top surface of the table 31 in the path of the depressions so that individual plates are selectively scraped from the bottom of this chute by the depressions 32 as the table rotates during the operation of the machine. Scraper element 53 serves to aid in this scraping action and helps position a single plate within a single depression 32 on the base. Tension on this member may be adjusted by means of a spring and screw mount 54. The entire chute assembly is bolted to the cross arm of a T shaped support assembly 18 (see Fig. 1) in a conventional manner as shown.

It will be seen from the drawing that the brush 70 is rotated constantly during the operation of the machine by means of the belt 71 passing over pulleys 72 and 73 and driven by a pulley of the drive assembly 17. The brush itself is supported by the leg of the angle iron support assembly 18 and which is also used to support the feeder assembly 50, the feeler gauge 80 and the screen assembly 100.

Figures 5, 6:
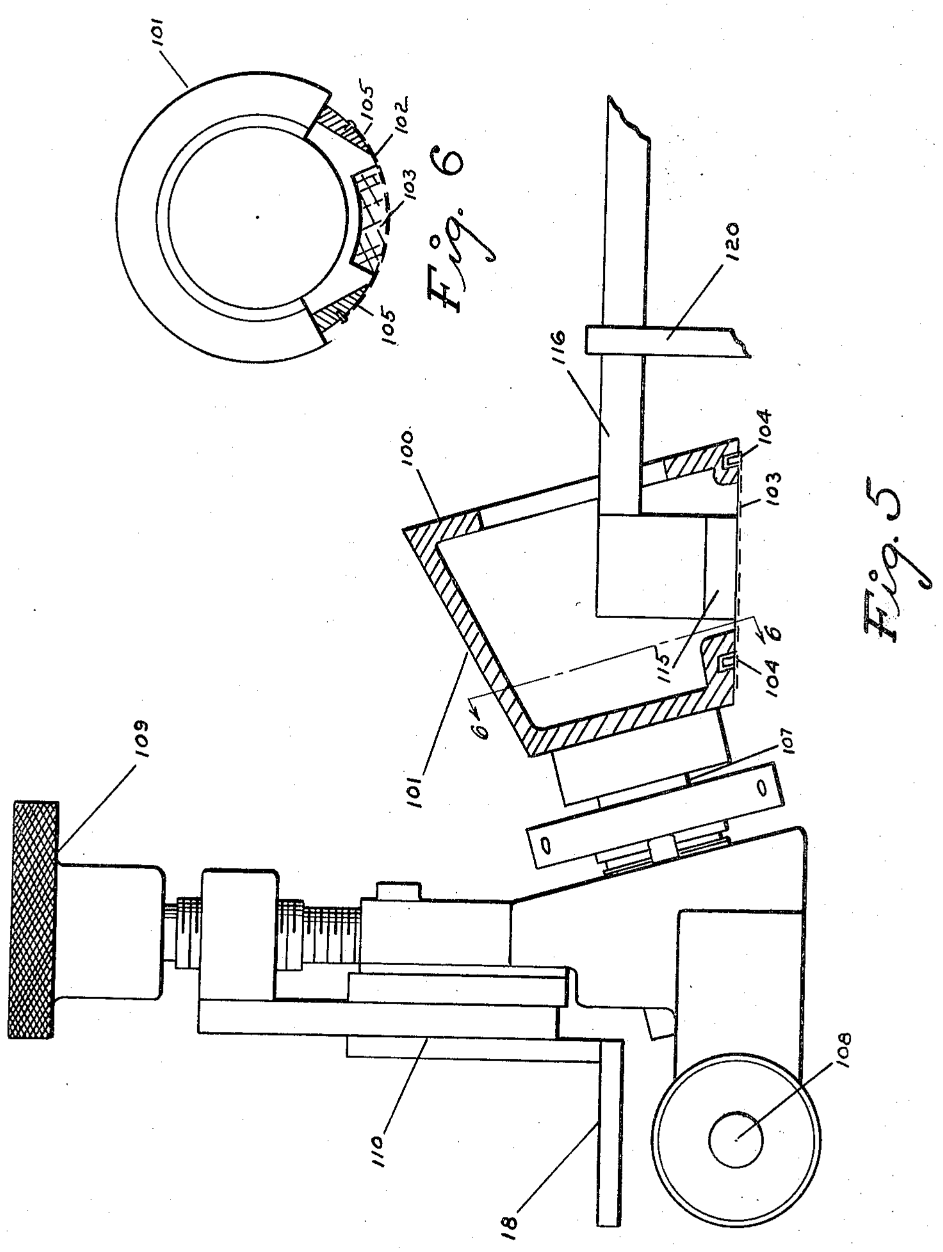
Figure 5 shows the conical screening mechanism employed partially in section.
Figure 6 shows the screen itself taken from its larger diameter along line 6—6 in Figure 5.

The screen assembly 100 consists broadly of a truncated cone 101 shown in Figures 5 and 6. This cone, as indicated in Figure 6, is formed largely of solid metal having wall openings 102 formed in a number of spaced distances around its periphery. Each of these openings is covered by a screen 103 containing the pattern of the printed circuit element which it is desired to place upon the dielectric plates. Two sections of these screens are held in position by ring-like members 104 which continue around the top and the bottom of the cone 101 parallel to its base. The other sections of the screen are held in position by a clamping action between the walls 105 of the cone proper and the walls of the opening 102. The screen itself is rotated by an appropriate shaft 107 connected to rotate by a gear 43 as seen in Figures 1 and 3. This shaft 107 is carried by a support mounted to pivot about an axis 108 in such a manner that it may be raised or lowered by means of the adjusting assembly 109 which will be understood by the inspection of Figure 5. The assembly is in turn connected by an appropriate mount 110 to the angle iron structure 18 (note Figures 1 and 2).

A squeegee 115 mounted upon an arm 116 pivoted about the fulcrum 117 normally rides within the conical assembly 101 squeegee carrying with it an appropriate conducting ink which is applied to the plates through the screen elements 103. A guide 119 consisting of a lever arm 120 helps position the squeegee properly within the screen and serves to lift the squeegee in response to a pushing action against this arm by the extended levers 48 mounted upon the table 30.

The stacker mechanism 130 is an optional part of the machine structure of this invention. That is, it may be used with the invention, or it may be replaced by other structures similarly constructed which are capable of accomplishing the same or related purposes. Thus, while this assembly is purely mechanical in nature employing a gripping action, it may be replaced with a similar device which employs merely a suction action. Broadly, this stacker mechanism consists of a cylindrical portion 131 driven by a shaft 132 which is supported by bearings 133 attached to the top 12 at 134. This shaft is driven by the gear 135 through the speed reducer gears 17. Four different length arms 136, 137, 138, and 139 are mounted at equal spaces around the circular portion 131 and are equipped so as to slide to various locations in response to pressures induced upon them at 141, 142, 143, and 144 by the off-center wheel 145. The action upon these arms forces the ends of them to pick up by a gripping action against a fixed hook member the small printed particles from the table 30 and to deposit these elements upon an appropriate moving belt not shown to the right of the machine in the location designated as 149. Picking up and stacking machines of the type used here have been known and used for many years. Hence, they are not discussed more fully.

*Operation*

During the operation of this machine a series of rectangular ceramic plates are placed within the chute 50. As the table 30 turns these plates are sequentially dropped into the depressions 32 upon the table. Any broken plates, or improperly positioned plates, are removed by the constantly turning brush 70 as the table moves beneath it. In those cases where for some reason a plate did not become placed within the depression 32, or was removed by a brush 70, this fact is detected by the feeler gauge 80 of conventional construction which is mounted to overlie the table 30 and the depressed openings 32. It is to be understood throughout the process that the plates are held in position within these openings by suction until this suction is cut off so that the plates may be removed by the stacker assembly.

When the feeler gauge detects the absence of any of these plates, an electrical impulse is transmitted to the solenoid mechanism 81 having a projecting arm 82 which lies in the plane of slidable stops 48. The actuation of the solenoid causes this arm to retract away from the center of the table and thereby pull out the stop 48 that happens to be moving by at that moment. With reference to Figures 3 and 4, it is seen that these levers are positioned immediately below the table 30 and there is one stop for every depression 32 within this table.

As the top 30 rotates, the screen 101 rotates with it, and an appropriate layer of ink is deposited upon the plates within the openings 32 by the action of the squeegee 115 forcing ink through the screen layers 103 containing the individual patterns to be stenciled. In those cases in which the feeler gauge has detected that no plates are present within the depressed openings 32, the lever arm 120 is actuated by the extended levers 48 so as to lift the squeegee arm 116. When this is done, the squeegee does not contact the screen 103, and no ink is deposited. The extended arms are returned to their normal operating position by means of the cam member 84 which pushes them in as the machine rotates. It will be thus understood that the units 80 and 81, cams 48 and the squeegee control linkage 120 cooperate together to provide a "skip printing" system which effectively precludes the application of printing to any empty recessed cavity 32. This innovation substantially reduces the time necessary to clean the machine and effectively prolongs its operating period. After the base plates have been printed, they are removed from the table 30 by the stacker mechanism substantially as described earlier in such a manner that the still wet printed elements are not smeared or smudged. This stacker element deposits the lifted plates upon an appropriate moving belt (not shown) which conveys them to a drying and/or curing oven.

The machine herein described for printing small dielectric plates has speeded up the production of printed circuit elements approximately one thousand times the prior production rate, and, in addition, has made possible the production of these printed circuit elements having extremely accurate and predictable electrical properties. This is of utmost importance when working with resistance inks and the like. Those skilled in the art will realize that a great many modifications of the invention may be made. For example, it is not absolutely necessary to use the specific belt and speed reducer arrangement set forth. Those skilled in the art will be able to replace many of these elements with equivalent operating means. Such changes are to be considered as part of this invention in so far tthey are defined by the appended claims.

I claim:

1. In a printing machine for printing onto plate shaped workpieces in combination, a supporting base structure, a continuously rotatable turntable having a flat upper work supporting surface mounted upon said base and including a series of circularly distributed recessed work supporting cavities, a work piece feeder chute supported by said base structure and positioned to overlie said table in the line of movement of said recessed cavities to hold a stack of workpieces and cause successive workpieces to drop into the successive cavities, a roller type screen printing assembly supported by said base structure and positioned to overlie said table immediately above the line of movement of said recessed cavities, and driving mechanism connected to continuously rotate the turntable and the screen printing assembly.

2. A printing machine comprising a base, a table having a flat upper surface mounted upon said base, a series of depressed work supporting recesses circularly distributed in the upper surface of said table around its axis of rotation, said work supporting recesses extending only partially through said table, a feeding mechanism positioned over a portion of the path through which the recesses rotate, said feeding mechanism being connected to drop workpieces in the successive recesses, brushing means positioned to overlie and brush over the recesses as they move away from the feeding mechanism for removing improperly located workpieces from the upper surface of said table, a roller type printing screen assembly positioned immediately above another portion of the path through which the recesses rotate, means for rotating said screen assembly with said table, and means to force electrically conductive inks through said screen assembly as it moves into contact with a workpiece in a recess.

3. The machine of claim 1 wherein means are provided for applying suction in said work supporting cavities to securely hold all rotating workpieces in place.

4. The machine of claim 2 wherein means are provided for applying suction in said work supporting recesses to securely hold all rotating workpieces in place.

5. The machine of claim 1 wherein means are provided for applying suction in said work supporting cavities to securely hold the rotated workpieces in place, and a brush overlying said cavities and adapted to brush improperly located workpieces from said cavities.

6. In a machine for the rapid production of printed circuit components comprising in combination, a support structure, a continuously revolvable work turntable supported by said support structure and including an upper work surface having work supporting means, said work supporting means comprising a plurality of circularly distributed recessed cavities in said table surface, a work piece feeder assembly positioned to overlie a portion of the work surface of said table and projecting in the line of movement of said recessed cavities, said feeder assembly comprising a chute structure supporting a stack of said work pieces against the table surface so that the lowest work piece of the stack drops into a cavity and is scraped away by the cavity as it moves past, a rotatable brush supported by said support structure and positioned to engage said turntable in the movement path of the work-piece-carrying cavities, the periphery of said brush at least abutting the surface of said turntable to brush away improperly loaded work pieces and any loose particles as the brush rotates, and printing mechanism connected to apply printing to the brushed work pieces carried by the cavities.

References Cited in the file of this patent

UNITED STATES PATENTS

| | | |
|---|---|---|
| 167,787 | Redstone | Sept. 14, 1875 |
| 804,425 | Mountford | Nov. 14, 1905 |
| 1,188,648 | Hastings | June 27, 1916 |
| 1,843,377 | Wickwire | Feb. 2, 1932 |
| 1,879,990 | Oles | Sept. 27, 1932 |
| 1,892,545 | Ward | Dec. 27, 1932 |
| 2,116,467 | Secoy | May 3, 1938 |
| 2,207,351 | McLaughlin | July 9, 1940 |
| 2,229,346 | Shurley | Jan. 21, 1941 |
| 2,278,570 | Shurley | Apr. 7, 1942 |

OTHER REFERENCES

"Printed Circuit Techniques," published by National Bureau of Standards Circular No. 468. For sale by Superintendent of Documents, U. S. Gov't Printing Office, Wash., D. C. Pages 10, 11 and 12. (Copy in Div. 17.)